United States Patent [19]

Utner et al.

[11] Patent Number: 4,974,116
[45] Date of Patent: Nov. 27, 1990

[54] WOUND ELECTRICAL CAPACITOR

[75] Inventors: Ferdinand Utner, Regensburg; Udo Hieber, Heidenheim-Schnaith, both of Fed. Rep. of Germany

[73] Assignee: Siemens Aktiengesellschaft, Berlin and Munich, Fed. Rep. of Germany

[21] Appl. No.: 448,898

[22] Filed: Dec. 12, 1989

[30] Foreign Application Priority Data

Jan. 18, 1989 [EP] European Pat. Off. ........ 89100803.9

[51] Int. Cl.⁵ .............................................. H01G 1/11
[52] U.S. Cl. .................................................. 361/275
[58] Field of Search ................................ 361/272, 275

[56] References Cited

U.S. PATENT DOCUMENTS 4,296,453 10/1981 Aigle et al. ........................ 361/275
4,577,257 3/1986 Erhardt et al. ..................... 361/272

FOREIGN PATENT DOCUMENTS 0132634 2/1985 European Pat. Off. .
2825377 12/1978 Fed. Rep. of Germany .
2428310 1/1980 France .

Primary Examiner—Donald A. Griffin
Attorney, Agent, or Firm—Hill, Van Santen, Steadman & Simpson

[57] ABSTRACT

A wound electrical capacitor, particularly a power capacitor, that is integrated in a housing together with an over-pressure breakaway fuse that is composed of an electrical current conductor having a rated break point arranged at least partially in a hollow tube, and whereby the current conductor is releasably secured to an inwardly-arced floor upon interposition of an insulator.

36 Claims, 7 Drawing Sheets

WOUND ELECTRICAL CAPACITOR

BACKGROUND OF THE INVENTION

1. Field of the Invention

The present invention relates to a wound electrical capacitor, particularly a power capacitor, that is integrated in a housing together with an over-pressure breakaway fuse that is composed of an electrical current conductor having a rated break point arranged at least partially in a hollow tube, and whereby the current conductor is secured to an inwardly-arced floor upon interposition of an insulator.

2. Description of the Prior Art

A capacitor of the type generally set forth above is disclosed in the German application DE 28 25 377 C2.

The over-pressure breakaway fuse serves the purpose of interrupting the current supply to the winding packet when a defined over-pressure (for example 2 bar) is reached in the capacitor. For example, the over-pressure can arise given too great a development of heat in the capacitor winding or, respectively, when gaseous decomposition products arise due to self-curing processes in oil-impregnated capacitors.

In the known breakaway fuse, a cross-sectional constriction (rated break point) is provided in the lead-in region between the cover bushing and the winding contact. This cross-sectionally constricted line portion, for example, a notched, tubular electrical conductor of copper, is anchored to the inwardly-arced floor via an insulator, so that the cross-sectional constriction breaks given internal over-pressure and the deformation of the floor produced as a result thereof, the flow of current being thus interrupted.

For anchoring the cross-sectionally constricted current conductor, is secured in the floor of strap retainers by way of an insulator. The strap retainers (metal bands) are thereby inserted through an opening in the floor and through a disc, are multiply folded and the entire region is subsequently soldered tight.

This work sequence is not only involved, but also repeatedly leads to leaky locations as well as to the penetration of solder drops into the interior of the capacitor, electrical outages (for example shorts) being produced as a result thereof. Moreover, this technique assumes solderable, tinned surfaces of the floor, so tin platings that are in part expensive must be provided in the solder region given materials that are not intrinsically solderable such as, for example, steel.

SUMMARY OF THE INVENTION

It is therefore an object of the invention to provide a capacitor of the type generally set forth above in which the aforementioned difficulties are eliminated and such that, further, the protection system can be assembled in a simple manner.

The above object is achieved, according to the present invention, in that a connector rigidly connected to the floor and a connector connected to the current conductor are latch connected to one another for securing the current conductor and in that the connector joined to the floor is mounted without an opening in the floor.

According to a feature of the invention, the latched connection is composed of a plug having a shoulder and a latch spring having clearances and in that the shoulder of the plug engages into the clearances of the latch spring.

According to another feature of the invention, the latch spring is constructed as a two-leaf structure or as a four-leaf structure.

According to another feature of the invention, a safety spring is arranged at the latch spring.

According to another feature of the invention, the safety spring has at least 1.25 turns.

According to another feature of the invention, guide ribs are arranged at the plug.

According to another feature of the invention is that the latch connection is composed of a plug having a shoulder and of a latch spring having notches, the plug has introduction bevels.

According to another feature of the invention, the plug is secured to the floor and the latch springs are secured to an insulating spacer.

According to another feature of the invention, the latch spring is secured to the floor.

According to another feature of the invention, a snap-in connection comprising a bushing having a latch nose and a plug.

According to another feature of the invention, the plug comprises spring elements.

According to another feature of the invention, the plug is mounted at the floor.

According to another feature of the invention, the bushing is mounted at the floor.

According to another feature of the invention, the snap-in connection is composed of a bushing having a beaded edge or, respectively, a turned edge that is mounted at the floor and of a latch spring having notches, and in that the edge of the bushing engages into the notches of the latch spring.

According to another feature of the invention, the snap-in connection is composed of an insulating strip having a shoulder and of a latch spring having notches, and in that the shoulder of the strip engages into the notches of the latch spring.

According to another feature of the invention, the latch spring is mounted at the floor.

According to another feature of the invention, the insulating strip is mounted at the floor.

According to another feature of the invention, an insulating cap is arranged between the capacitor winding and the floor, the insulating cap extending into the hollow tube of the capacitor, and in that introduction bevels and/or guide ribs are arranged at the insulating cap.

According to another feature of the invention, the part rigidly joined to the floor is welded to the floor.

According to another feature of the invention, the part rigidly joined to the floor is held by a deformation of the floor.

According to another feature of the invention, the floor and the housing are joined to one another by a rolling seam weld and have their ends joined to one another by an additional weld.

According to another feature of the invention, the current conductor comprises a crimp location for fixing the breakway fuse.

According to another feature of the invention, at least one key is employed for fixing the breakaway fuse.

BRIEF DESCRIPTION OF THE DRAWINGS

Other objects, features and advantages of the invention, its organization, construction and operation, will be best understood from the following detailed description, taken in conjunction with the accompanying drawings, on which.

DESCRIPTION OF THE PREFERRED EMBODIMENTS

Figure 1:
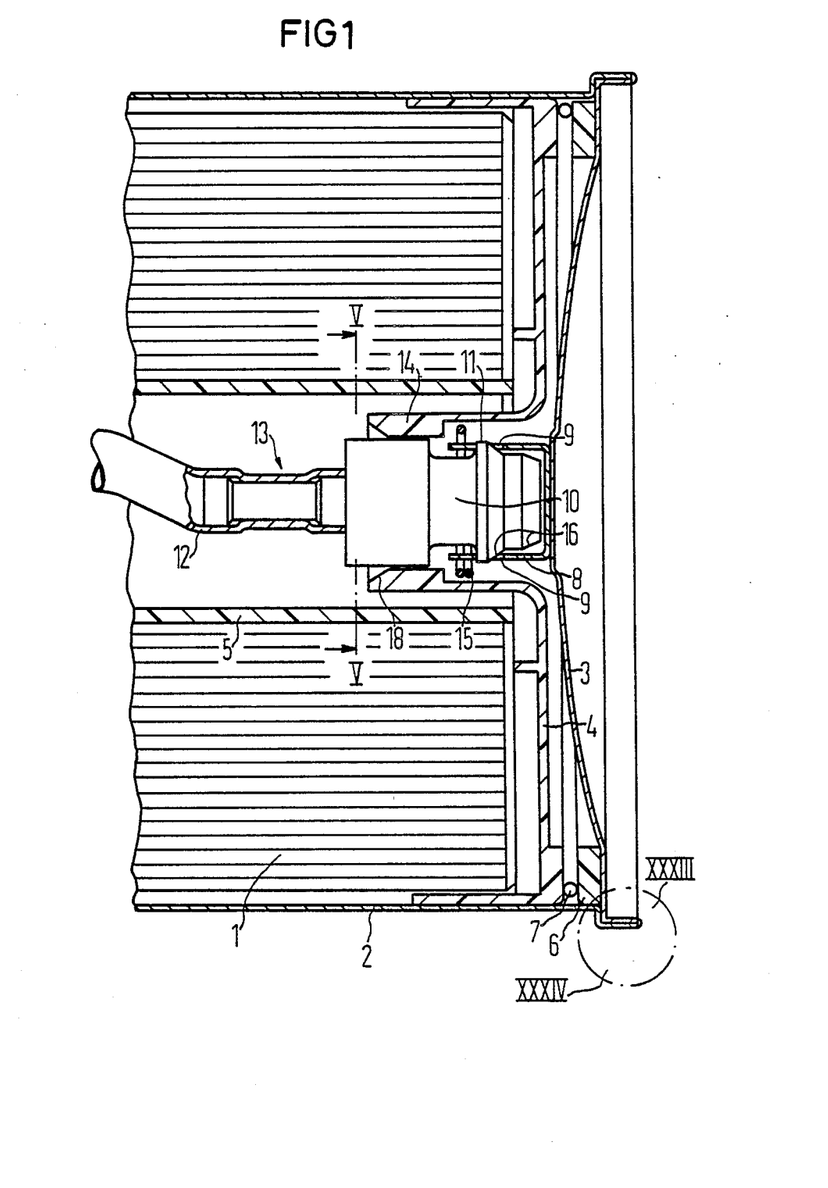
FIG. 1 is a fragmentary sectional view of a capacitor constructed in accordance with the present invention and comprising a plastic plug and a latch spring.

Referring to FIG. 1, a capacitor winding 1 is illustrated that is built into a can-shaped housing 2 of, for example, stainless steel. The housing 2 is closed with a floor 3 that can likewise be composed of stainless steel. An insulating cap 4 that partially extends into a hollow tube 5 of the capacitor winding is provided for insulating the capacitor winding 1 from the housing 2 and from the metallic floor 3. For shake-proof fastening, an insulating ring 6 and an annular spring 7 are arranged between the floor 3 and the insulating cap 4. A latch spring 8 is secured to the floor 3, for example by welding. The latch spring 8, for example, is executed as a two-leaf structure of as a four-leaf structure and has notches 9 into which the shoulders 11 of a plug 10 engage. The plug 10 is composed of an insulating plastic and is joined to the current conductor 12 by a crimp 13, the current conductor 12, for example, being composed of a copper conductor tube having a rated break point that is not shown in FIG. 1.

For assembly, the housing 2 comprising the welded-in floor 3 and the latch spring 8 is slipped over the assembled packet of the capacitor winding or windings 1 having the projecting plug 10 until the plug 10 snaps into the latch spring 11.

In order to prevent a bending of the latch spring 8 that, for example, is a two-leaf structure or a four-leaf structure, upon introduction of the plug 10 and given a potential, subsequent shaking stress (vibration resistance), guide elements 14 either in the insulating cap 4 or at the plug 10 are advantageous. It is also advantageous for this purpose to arrange a safety spring 15 at the latch spring 8. The safety plug 15 is expediently composed of spring wire and has more than 1.25 turns.

The safety spring 15 also has the advantage that the latch spring 8 can be manufactured of stainless steel sheet since the spring properties greatly deteriorate given spring sheets of more cost-beneficial materials due to the welding process when connecting the latch spring 8 to the floor 3.

Figures 4, 6:
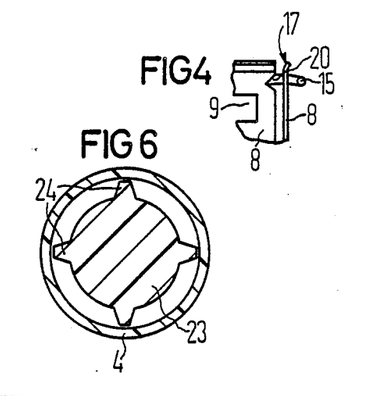
FIG. 4 is a fragmentary view of the details of a latch spring structure.
FIG. 6 s a sectional view of a further exemplary embodiment of a plastic plug.

A further improvement in the introduction of the plug 10 into the latch spring 8 can be achieved when introduction bevels 17 are provided at the latch spring 8 in addition to the introduction levels 16 provided at the plug 10, as shown in FIG. 4.

Further, additional introduction bevels 18 can be provided at the insulating cap 4.

As already mentioned, the plug 10 is fabricated of plastic, for example is turned from resin-bonded fabric or is injected or, respectively, molded of plastic.

Figure 2:
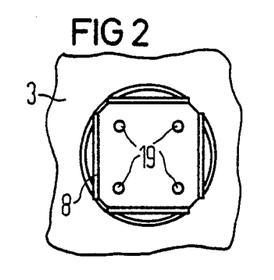
FIG. 2 is a fragmentary view of the details of a latch spring structure.

FIG. 2 shows a four-leaf latch spring 8 that is secured to the floor 3 with four spot welds 19.

Figure 3:
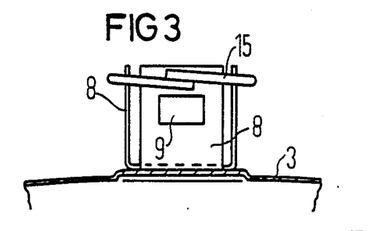
FIG. 3 is an elevation view of the details of a latch spring structure.

FIG. 3 shows the side view of a latch spring 8 arranged at the floor 3 and comprising an aperture 9 and a safety spring 15.

FIG. 4 shows a portion of the structure of FIG. 3 comprising a latch spring 8 and a recess 9. As already mentioned above with respect to FIG. 1, the latch spring comprises an introduction bevel 17 and has a further opening 20 for the guidance of the safety spring 15.

Figure 5:
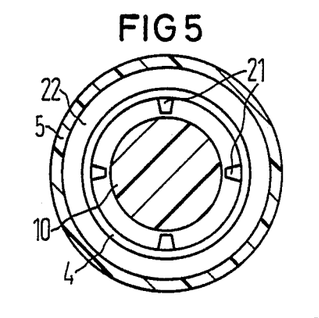
FIG. 5 is a fragmentary sectional view taken generally along the parting line IV—IV of FIG. 1.

FIG. 5 illustrates a sectional view conforming to FIG. 1 from which one may see that a plurality of guide grips 21 are arranged at the insulating cap 4 in order to facilitate the introduction of the plug 10. It is advantageous to provide a spacing 22 between the insulating cap 4 and the hollow tube 5 that can potentially accept windings of the capacitor given the construction of a capacitor from a plurality of sub-windings.

FIG. 6 shows the exemplary embodiment of a further plug 23 that comprises a plurality of guide ribs 24 in order to facilitate the introduction into the insulating cap 4.

Figures 7, 8:
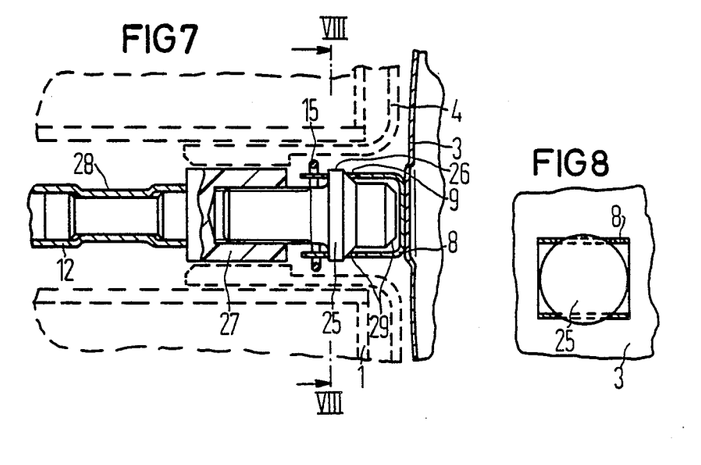
FIG. 7 is a fragmentary sectional view of an exemplary embodiment of a metal plug and of a latch spring in relationship to the general structure of a capacitor as illustrated in FIG. 1.
FIG. 8 is a sectional view taken generally along the parting line VIII—VIII of FIG. 7.

FIG. 7 illustrates an exemplary embodiment wherein a plug 25 of metal having a shoulder 26 snaps into the aperture 9 of the latch spring 8. In order to avoid shorts between the current conductor 12 and the metallic floor 3, the plug 25 is joined to the current conductor 12 with a crimp 28 by way of an insulating spacer 27. The plug 25 has introduction bevels 29 for easier introduction. Moreover, identical parts of FIG. 7 are provided with the same reference characters as in the preceding figures.

FIG. 8 shows a sectional view taken from FIG. 7 from which one can see that the two-leaf latch spring 8 is welded to the floor 3 and forms a snap-in connection with the metal plug 25.

Figure 9:
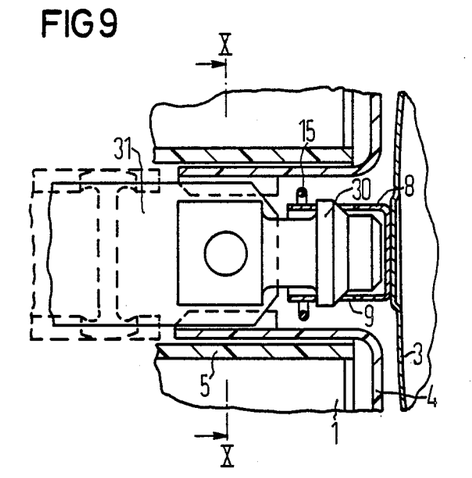
FIG. 9 is a fragmentary sectional view of a metal plug and a latch spring shown in a general relationship with respect to a capacitor of the type illustrated in FIG. 1.

FIG. 9 shows an exemplary embodiment wherein a plug 30 constructed of metal snaps into the apertures 9 of the latch spring 8. In this exemplary embodiment, a punched or, respectively, extruded plastic strip 31 (resin-bonded fabric or thermoplastic) serves for insulation and for transmitting the tensile force onto the current conductor.

Figure 10:
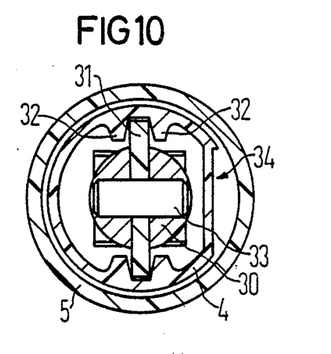
FIG. 10 is a sectional view taken generally along the parting line X—X of FIG. 9.

FIG. 10 shows a sectional view conforming to and taken from FIG. 9. It may be seen therefrom that a plurality of guide ribs 32 for guiding the plastic strip 31 are arranged in the insulating cap 4. The plug 30 has a pinned portion 33 for fastening the plastic strip 31. An interspace 34 for receiving the winding wiring is provided between the insulating cap 4 and the hollow core tube 5.

Figure 11:
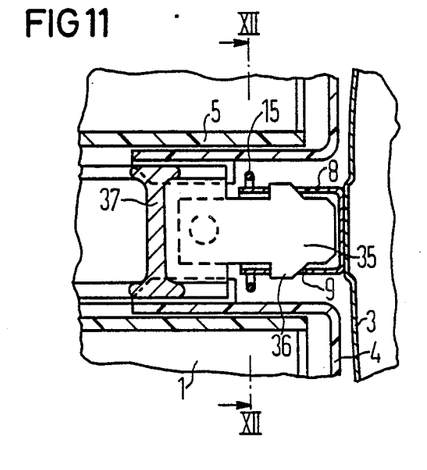
FIG. 11 is a fragmentary sectional view of an embodiment comprising a latch strip and a latch spring in relationship to the general structure of a capacitor of the type illustrated in FIG. 1.

FIG. 11 illustrates an embodiment wherein the plug is replaced by an insulating strip 35 (or, respectively, insulating plate). A configuration comprising a shoulder 36 that corresponds to the plug shape is cut or, respectively, applied to the end of the insulating strip 35. The insulating strip 35 can either be punched or can be manufactured with an extrusion process. Given manufacture with an extrusion process, the insulating strip 35 preferably has a double-T profile 37.

Figure 12:
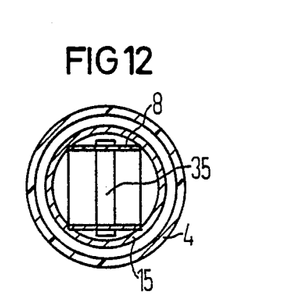
FIG. 12 is a sectional view taken substantially along the parting XII—XII of FIG. 11.

FIG. 12 shows a sectional view taken in conformity to and from the structure of FIG. 11. The insulating strip 35 engages into the two-leaf latch spring 38 that is secured with the safety spring 15.

Figure 13:
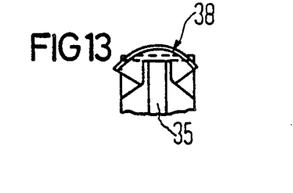
FIG. 13 is a fragmentary view of the details of the latch strip of FIGS. 11 and 12.

FIG. 13 shows the insulating strip 35 that has an introduction bevel 38 that serves the purpose of easier introduction into the latch spring 8.

Figure 14:
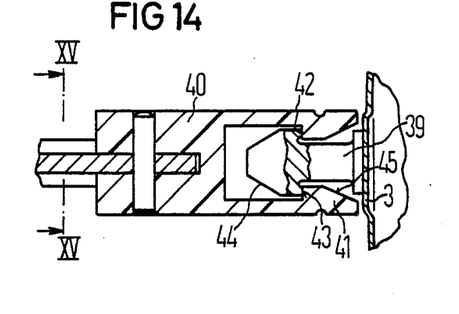
FIG. 14 is a fragmentary sectional view showing an exemplary embodiment of a latching bushing and plug.

FIG. 14 illustrates an exemplary embodiment wherein a plug 39 constructed of metal is welded to the floor 3. A bushing 40 of insulating material is joined to the current conductor, the bushing 40 having at least two spring elements 41 at its end. A shoulder 42 of the plug 39 forms a snap-in connection with the shoulder 43 of the spring elements 41. Introduction bevels 44 and, respectively, 45 are provided at the plug 39 and at the spring elements 41, respectively, to facilitate the introduction.

Figure 15:
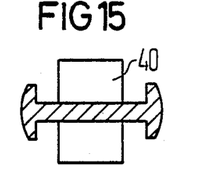
FIG. 15 is a sectional view taken substantially along the parting line XV—XV of FIG. 14.

FIG. 15 is a sectional view in conformity with and taken from the structure of FIG. 14 from which the profile of the bushing may be seen.

Figure 16:
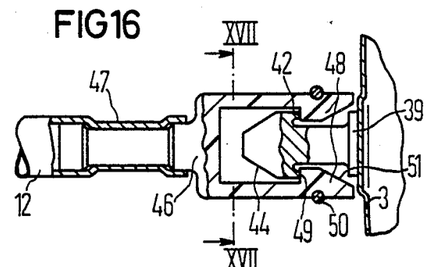
FIG. 16 is a fragmentary sectional view of a latching bushing and plug.

FIG. 16 shows a further exemplary embodiment of a bushing 46 constructed of an insulating material that is joined to the current conductor 12 with a crimp location 47. The bushing 46 has at least a pair of spring elements 48 at its end that form a snap-in connection with the shoulder 42 of the metal plug 39 with the shoulder 49, the metal plug 39 being welded to the floor 3. An annular safety ring 50 is provided to additionally promote the snap-in connection. The ends of the spring elements 48 also comprise introduction bevels 51.

Figure 17:
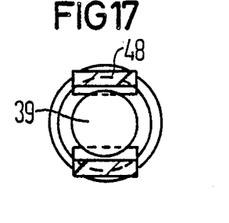
FIG. 17 is a sectional view taken substantially along the parting line XVII—XVII of FIG. 16.

FIG. 17 is a sectional view taken in conformity with the structure of FIG. 16 to additionally show the latching of the plug 39 to the bushing 46.

Figure 18:
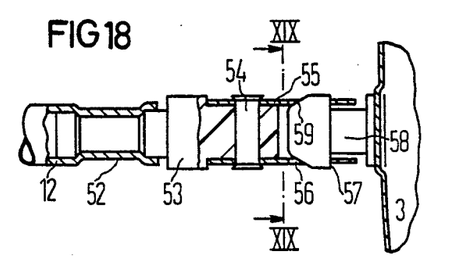
FIG. 18 is a fragmentary sectional view of an exemplary embodiment comprising a latch spring mounted at the current conductor.

FIG. 18 shows a further exemplary embodiment of a snap-in connection wherein an insulating spacer 53 is secured to the current conductor 12 with a crimp 52, a latch spring 55 being secured to the insulating spacer 53 with a rivet 54. The latch spring 55 comprises openings 56 into which a shoulder 57 of a plug 58 engages. The plug 58 is constructed of metal and is welded to the floor 3. For better introduction, the plug 58 has introduction bevels 59.

Figure 19:
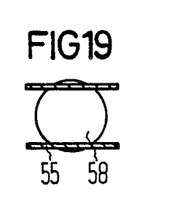
FIG. 19 is a sectional view taken substantially along the parting line XIX—XIX of FIG. 18.

FIG. 19 illustrates a sectional view taken with respect to and conforming to the structure of FIG. 18 from which one may see that a two-leaf latch spring 55 forms the snap-in connection with a plug 58. As in FIGS. 14 and 16, the plug 58 is welded to the floor 3.

Figure 20:
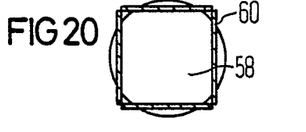
FIG. 20 is a sectional view illustrating a further exemplary embodiment of a latch spring.

FIG. 20 illustrates a further exemplary embodiment wherein the snap-in connection occurs between a four-leaf latch spring 60 and the plug 58, as would also be viewed as one would view FIG. 19.

Figure 21:
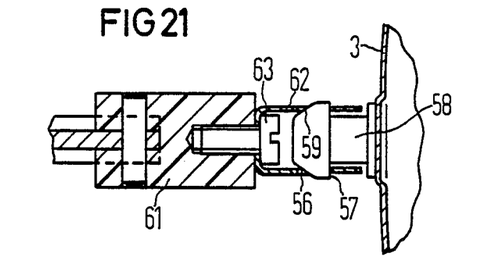
FIG. 21 is a sectional view of another exemplary embodiment of the invention showing a post or rivet structure received and latched, in a hollow tube.

FIG. 21 is a fragmentary sectional view illustrating another exemplary embodiment of the invention in which a latch spring 62 is secured to an insulator spacer 61 with a screw 63. The plug 58 has the same structure as that illustrated in FIG. 18 including introduction bevels 59 and a latch shoulder 57 which is received in openings 56 of the latch spring.

Figure 22:
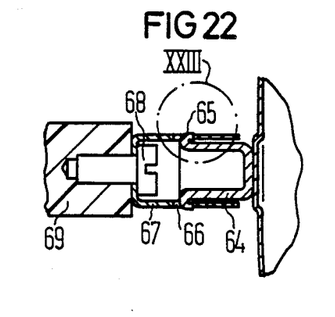
FIG. 22 is a fragmentary sectional view of structure similar to that of FIG. 21 in which the post structure has been replaced by a hollow tubular structure having a reentrant distal end.

FIG. 22 illustrates a form of a snap-in connection wherein a bushing 64 or, respectively, a tubular metal piece having a beaded or turned back edge 65 is mounted to the floor 3 with a spot weld. The edge 65 engages into openings 66 of the latch spring 67 that is secured with the screw 68 to an insulating element 69 as a spacer with respect to the current conductor.

Figure 23:
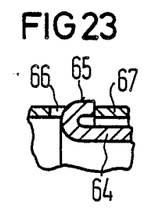
FIG. 23 is a fragmentary enlarged view of a portion of FIG. 22 referenced XXIII.

FIG. 23 is an enlarged view of the portion referenced XXIII in FIG. 22 showing the turned back edge 65 received in the opening 66.

Figure 24:
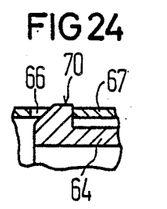
FIG. 24 is a fragmentary sectional view similar to that FIG. 23 and in which the distal end of the post includes a rearwardly facing shoulder formed on a radially-extending flange.

FIG. 24 shows a further embodiment of the bushing 64 that comprises a turned shoulder 70 that engages into the opening 66 of the latch spring 67.

Figure 25:
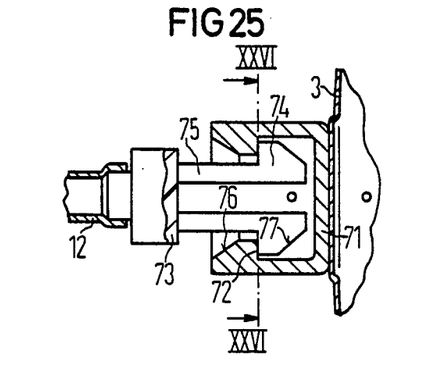
FIG. 25 is a fragmentary sectional view of a further exemplary embodiment of the invention with a hollow tubular structure connected to the floor for receiving a plug connected to the electrical conductor.

FIG. 25 illustrates an embodiment of a snap-in connection wherein a bushing 71 or, respectively, a tube section having a catch nose 72 is welded on the floor 3. A plug 75 including spring elements 74 is joined to the current conductor 12 via an intermediate insulator 73. The plug 75 can be composed of metal or of plastic whereby the intermediate insulator 73 can be eliminated given the plastic embodiment Introduction bevels 76 and, respectively, 77 are arranged at the bushing 71 and at the spring elements 74.

Figure 26:
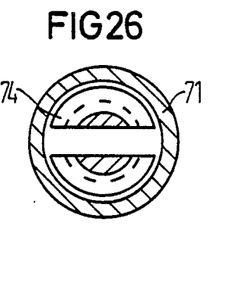
FIG. 26 is a sectional view taken substantially along the parting line XXVI—XXVI of FIG. 25.

FIG. 26 is an enlarged sectional view taken from FIG. 25 at the plane of the catch nose 72.

Figure 27:
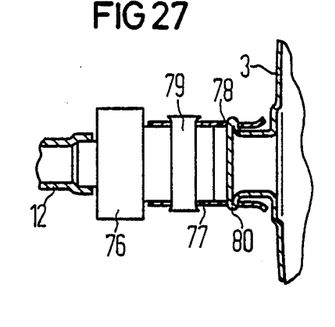
FIG. 27 is a fragmentary sectional view of an exemplary embodiment of the invention in which the part secured to the floor is mounted by deformation of the floor.

FIG. 27 illustrates an embodiment comprising a latch spring 77 including an opening 78 arranged at the current conductor 12 by way of an insulating spacer 76. The latch spring 77 is joined to the insulating member 76 with a rivet 79. The cooperating element for the snap-in connection is formed in that a rivet head 80 is formed by deformation of the floor 3.

Figure 28:
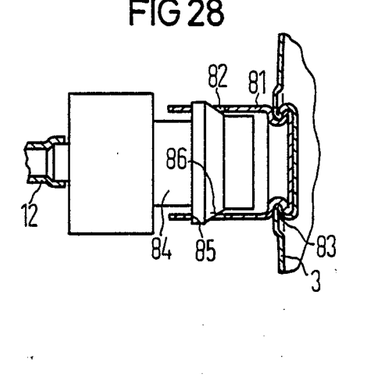
FIG. 28 is a fragmentary sectional view of an exemplary embodiment of the invention in which the part secured to the floor is mounted by different deformation of the floor.

FIG. 28 illustrates an embodiment of the invention wherein the latch spring 81 including opening 82 is held by a rivet deformation 83 of the floor 3. This embodiment is especially advantageous since a latch spring 81, composed of standard spring sheet, can be employed. The utilization of snap-in springs of normal spring sheet was not possible in the exemplary embodiment set forth above since the spring properties are largely lost due to the welding process. A plastic plug 84 including snap-in shoulders 85 and introduction bevels 86 serves as the cooperating element for the snap-in spring 81, the plastic plug 84 being connected to the current conductor 12.

Figure 29:
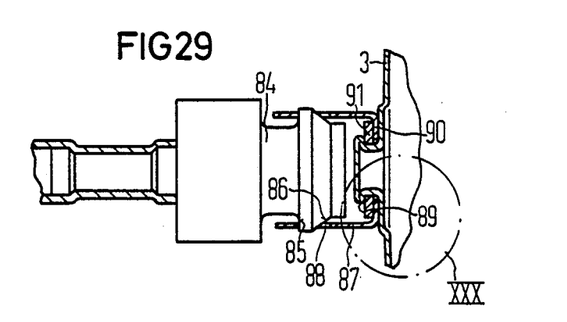
FIG. 29 is a fragmentary sectional view of an exemplary embodiment of the invention in which the part secured to the floor is mounted by a still different deformation of the floor.

FIG. 29 illustrates a further embodiment of the invention in which a snap-in spring 87 including openings 88 is held by a deformation of the floor 3. The floor 3 is thereby drawn in the form of a rivet head 89 so that the ends 90 of the snap-in spring 87 are clamped between the floor and a shim 91.

Figure 30:
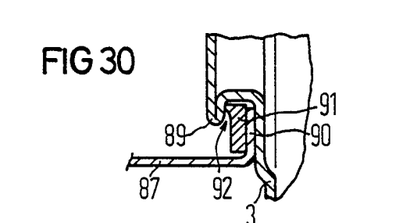
FIG. 30 is an enlarged fragmentary sectional view of a portion of FIG. 29 identified by the reference XXX.

FIG. 30, as mentioned above, is an enlarged view of the structure referenced XXX in FIG. 29 and better illustrates the rivet head 89 formed from the floor 3. The shim 91 for fastening the ends 90 of the snap-in spring 87 comprises a shoulder 92 that presses against the inside diameter of the tubular rivet 89 drawn from the floor 3.

Figure 31:
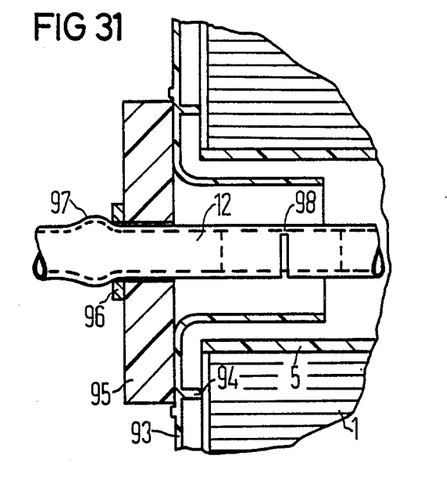
FIG. 31 is a fragmentary sectional view of structure for gripping the breakaway fuse.

FIG. 31 illustrates one possible structure for gripping the breakaway fuse in the housing. After the housing having the welded-in floor has been slipped over the assembled winding packet so that the snap-in connection set forth with reference to the exemplary embodiments above has been produced, a further insulating cap 93 is introduced into the hollow core tube 5 at the opposite end of the capacitor winding 1. Ribs 94 that fix the capacitor winding 1 extend from the insulating cap 93. An insulating plate 95 and the shim 96 are then slipped over the current conductor 12 and, after compensating the tolerances, are fixed by tightening the current conductor 12 with a crimp 97. A rated break point 98 that is formed by a cross-sectional constriction of the conductor 12 is arranged in the current conductor 12.

Figure 32:
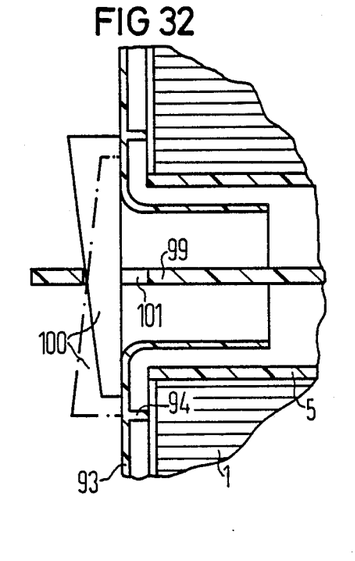
FIG. 32 is a fragmentary sectional view of structure for gripping the breakaway fuse.

FIG. 32 illustrates a further possible structure for intercepting the tensile force given a floor deformation due to internal pressure. The breakaway fuse is thereby held with an insulating strip or, respectively, strap retainer 99 that is punched or extruded and potentially comprises the rated or another fuse (conductor) mounted thereon and a winding wiring (not shown). The fixing of the strip 99 occurs with one or two keys 100 that extend through an opening 101 of the strip 99 and intercept the tensile forces via the insulating cap 93.

Figure 33:
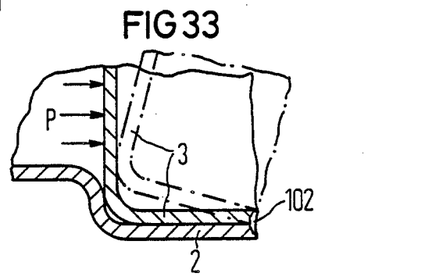
FIG. 33 is an enlarged fragmentary view of a portion of FIG. 1 identified by the reference 33.
Figure 34:
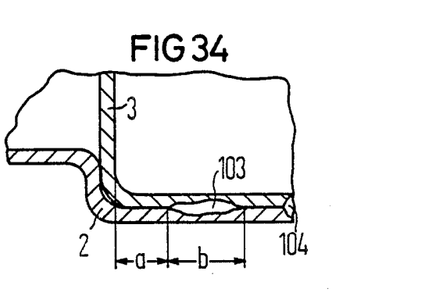
FIG. 34 is a fragmentary sectional view of the same portion of FIG. 1 which is further identified with the reference XXXIV.

FIGS. 33 and 34 are enlarged sectional views taken from FIG. 1 at the references XXXIII and XXXIV, respectively. The following discussion relates to these figures.

It may be seen from FIG. 33 that, given only a welding 102 at the ends of the housing 2 to the floor 3 via the wall thicknesses, the floor 3 can swing out about the weld 102 given low pressure loads P, this being illustrated with broken lines in FIG. 33.

In order to prevent the above, a spacing a between a further weld 103 and the widening of the housing or, respectively, the base of the floor in FIG. 34 must be as small as possible. This was achieved by a rolling seam weld having an expanse b at a location 103. Since, however, no absolute tightness can be guaranteed with such a rolling seam weld, the housing 2 and the floor 3 must additionally receive a further weld 102, 104 at their ends, this being obtained, for example, with inert gas shielded arc welding processes such as WIG (tungsten inert gas) or laser or, respectively, electron beam welding beam processes.

It may be derived from the above-described exemplary embodiments that the subject matter of the invention enables an easily-mountable anchoring system for an overpressure breakaway fuse without requiring an opening of or, respectively, soldering at the floor of the housing.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a wound electrical capacitor of the type in which a wound capacitor packet is carried on a hollow core tube and is mounted in a housing which includes an inwardly arced floor having an inner surface, and in which an electrical current conductor is mounted to extend at least partially in the tube and includes a rated break point forming a breakaway fuse, and in which the conductor is anchored to the floor by an insulating connection, the improvement comprising:

a latch comprising cooperable first and second snap-in connection means respectively connected to the electrical conductor and to the inner surface only of the floor for latching the current conductor to the floor.

2. The improved wound electrical capacitor of claim 1, wherein said latch connection comprises:

a plug connected to the electrical conductor and comprising an enlarged section including a shoulder; and     a latch spring connected to the inner surface of the floor and including wall means forming a recess for receiving said plug therein, said wall means including at least one opening having an edge facing opposite and engaging against said shoulder.

3. The improved wound electrical capacitor of claim 2, wherein:
said wall means of said spring comprises a two-leaf wall structure.

4. The improved wound electrical capacitor of claim 2, wherein:
said wall means of said spring comprises a four-leaf wall structure.

5. The improved wound electrical capacitor of claim 2, wherein:
said wall structure comprises a distal end; and
a safety spring is mounted about said wall structure adjacent said distal end to urge said wall structure inwardly after passage of said enlarged section of said plug.

6. The improved wound electrical capacitor of claim 5, wherein:
said safety spring comprises at least 1.25 turns.

7. The improved wound electrical capacitor of claim 2, and further comprising:
an insulating cap mounted in said housing between said winding packet and the arced floor and including a tubular section extending into the hollow core tube; and
said plug comprises a plurality of longitudinally-extending guide ribs on and spaced about said plug for guiding said plug in said tubular section.

8. The improved wound electrical capacitor of claim 2, and further comprising:
an insulating cap mounted in said housing between said winding packet and the arced floor and including a tubular section comprising longitudinally extending guide ribs spaced apart within said tubular section for guiding said plug.

9. A wound electrical capacitor comprising:
a housing;
an arced floor connected to and closing one end of said housing and including an inner surface;
a hollow core tube and a capacitor winding on said hollow core tube forming a capacitor winding packet, said capacitor winding packet mounted in said housing;
an electrical current conductor including a rated break point forming an overpressure breakaway fuse arranged at least partially in said hollow core tube;
a first connector connected to said inner surface only of said floor; and
a second connector in latching engagement with said first connector and connected to said electrical current conductor.

10. The wound electrical capacitor of claim 9, wherein:
said first connector comprises a latch spring including a base connected to said floor and spring arms extending from said base and including openings therein; and
said second connector comprises a plug including introduction bevels and shoulder means for engaging in said openings.

11. The wound electrical capacitor of claim 10, and further comprising:
safety spring means on said spring arms for urging said spring arms towards one another.

12. The wound electrical capacitor of claim 11, wherein:
each of said spring arms comprises at least one notch therein; and said safety spring means comprises a spring wire wound at least 1.25 turns about the distal ends of said spring arms and engaging said notches.

13. The wound electrical capacitor of claim 11, wherein:
said spring arms comprise edges including notches therein; and
safety spring means comprises a spring wire wound about said spring arms and received in said notches.

14. The wound electrical capacitor of claim 9, wherein:
said first connector comprises a latch tube structure including a base connected to said floor and spring arms extending from said base, each of said spring arms including a latch shoulder facing said base; and
said second connector comprises a plug including spring arms, each of said spring arms having an introduction bevel and a latch shoulder for engaging said latch shoulder of said latch tube.

15. The wound electrical capacitor of claim 9, wherein:
said first connector comprises a latch spring including a base and at least two spring arms extending from said base, each of said spring arms comprising an opening therein and an inwardly-extending detent section forming a notch;
said arced floor comprises a deformed section shaped to embrace in said notch of said spring arms and lie flat against said base; and
said second connector comprises a plug including introduction bevels for spreading said spring arms and shoulder means for engaging in said opening of said spring arms.

16. The wound electrical capacitor of claim 9, and further comprising:
a washer;
said first connector comprises a latch spring including at least two spring arms, each of said spring arms including an opening therein and a projection extending towards the light projection of the other spring arm;
said arced floor comprises a deformed portion including a flat section and a rivet-shaped section extending from said flat section and including a head, said washer and said projections clamped between said flat section and said head; and
said second connector comprises a plug including introduction bevels for spreading said spring arms and shoulder means for engaging in said openings in said spring arms.

17. The wound electrical capacitor of claim 9, wherein:
said first connector comprises a closed tube structure including a base connected to said inner surface of said arced floor, a tubular wall extending from said base to an open distal end and an inwardly-extending flange comprising a conical bevel at the distal end and a first shoulder facing said base; and
said second connector comprises a plug including a plug base and a pair of spring arms extending from said plug base, each of said spring arms comprising an introduction bevel to engage said conical bevel and inwardly deflect its respective spring arm and a second shoulder for engaging behind said shoulder of said flange.

18. The wound electrical capacitor of claim 9, wherein:

said first connector comprises a plug connected to and extending from said floor, said plug including a distal end, an outward radially-extending flange spaced from said distal end and comprising a first shoulder facing said arced floor, and a conical introduction bevel extending from said distal end to said flange; and said second connector comprises a tubular structure including at least two spring arms, each of said spring arms including an introduction bevel and a second shoulder for engaging behind said first shoulder of said plug.

19. The wound electrical capacitor of claim 18, and further comprising:

safety spring means on and bridging said spring arms towards one another.

20. The wound electrical capacitor of claim 19, wherein:

each of said plug spring arms comprises an external notch therein; and said safety spring means engages in said plug spring arm notches.

21. The wound electrical capacitor of claim 20, wherein:

said tubular structure comprises a distal end, said spring arm introduction bevels at said distal end; and a safety spring is mounted about said tubular structure adjacent said distal end to urge said spring arms inwardly after passage of said outward radially-extending flange of said plug.

22. The wound electrical capacitor of claim 9, and further comprising:

an insulating cap mounted between said arced floor and said capacitor winding packet, said insulating cap including a hollow tube extending into said hollow core tube, and including diametrically-opposed pairs of spaced-apart ribs extending inwardly of said insulating cap hollow tube;

and wherein said second connector comprises a plug including a planar base received between said pairs of ribs, a distal end, introduction bevel means adjacent said distal end, and a latch shoulder spaced from said distal end and from said introduction bevel means, said first connector comprising a latch spring including a base connected to said inner surface of said arced floor and spring arms extending from said base and including openings therein for receiving and engaging against said latch shoulder.

23. A wound electrical capacitor comprising:
a hollow tubular housing;
an arced floor connected to one end of and closing said housing and including an inner surface;
a hollow core tube and a capacitor winding on said hollow core tube forming a capacitor winding packet including a first end and a second end;
an electrical current conductor including a rated break point forming a breakaway fuse arranged at least partially in said hollow core tube;
latch connection fastening means connected to said conductor on one side of said break point and connecting said conductor at said first end of said capacitor winding packet to said inner surface only of said arced floor; and
insulating means fixing said conductor, against movement toward said arced floor, on the other side of said break point to said second end of said capacitor winding packet so that movement of said arced floor away from said winding packet causes said electrical current conductor to break at said break point.

24. The wound electrical capacitor of claim 23, wherein:

said one end of said housing comprises a predetermined cross-sectional dimension and a flat distal end section of a larger cross-sectional dimension including an edge;

said arced floor comprises a section extending parallel to and in intimate contact with said flat distal end section and including an edge adjacent said edge of said flat distal end section;

a first weld joining said edges; and a second weld spaced from said first weld and joining said sections.

25. The wound electrical capacitor of claim 24, wherein:

said second weld is a rolling seam weld.

26. The wound electrical capacitor of claim 24, wherein:

said first weld is an inert gas shielded arc weld.

27. The wound electrical capacitor of claim 26, wherein:

said first weld is a tungsten inert gas weld.

28. The wound electrical capacitor of claim 26, wherein said first weld is a laser weld.

29. The wound electrical capacitor of claim 23, wherein said insulating means comprises:

an insulating cap bearing against said second end of said capacitor winding packet;

an insulating disc including an aperture receiving said electrical current conductor therethrough and bearing against said insulating cap;

a washer bearing against said insulating disc; and a bead on said electrical current conductor bearing against said washer.

30. The wound electrical capacitor of claim 23, wherein said insulating means comprises:

an insulating cap bearing against said second end of said capacitor winding packet and including a central opening;

an insulating strap extending through said central opening and connected to said electrical current conductor, said strap including an opening therethrough; and at least one wedge extending through said opening in said strap and bearing against said strap and said insulating cap.

31. In a wound electrical capacitor of the type in which a wound capacitor packet is carried on a hollow core tube and is mounted in a housing which includes an inwardly arced floor including an inner surface, and in which an electrical current conductor is mounted to extend at least partially in the tube and includes a rated break point forming a breakaway fuse, the improvement by which the conductor is anchored to the arced floor by an insulating connection, the improvement comprising:

first and second cooperable latching parts forming snap-in connection means, one of said parts connected to said inner surface only of said arced floor and the other of said parts connected to said electrical current conductor.

32. A wound electrical capacitor comprising:
a can-shaped hollow housing including an open end;

a capacitor winding packet in said housing including a hollow core tube and a capacitor winding on said hollow core tube and defining a first end, and a second end adjacent said open end of said housing;

an arced floor connected to and closing said open end of said housing, said arced floor including an inner surface and responsive to an overpressure in said housing to deform outwardly;

an electrical current conductor extending at least partially through said hollow core tube and including a rated break point forming a breakaway fuse;

a first insulating cap bearing against said first end of said capacitor winding packet and including a central opening receiving said electrical current conductor therethrough;

fastening means connected to said electrical current conductor on one side of said break point and bearing against said first insulating cap to inhibit movement of said electrical current conductor towards said arced floor;

a second insulating cap bearing against said second end of said capacitor winding packet and including a central hollow tube extending into said hollow core tube;

a first latch part connected to the other side of said electrical current conductor and extending in said central hollow tube towards said arced floor; and a second latch part connected to said inner surface only of said arced floor and extending into said central hollow tube to latch to said first latch part.

33. A wound electrical capacitor comprising:
a can-shaped hollow housing including an open end;
a capacitor winding packet in said housing including a hollow core tube and a capacitor winding on said hollow core tube and defining a first end, and a second end adjacent said open end of said housing;

an arced floor connected to and closing said open end of said housing, including an inner surface and responsive to an overpressure in said housing to deform outwardly;

an electrical current conductor extending at least partially through said hollow core tube and including a rated break point forming a breakaway fuse;

a first insulating cap bearing against said first end of said capacitor winding packet and including a central opening;

fastening means connected to said electrical current conductor on one side of said break point and extending through said central opening and bearing against said first insulating cap to inhibit movement of said electrical current conductor toward said arced floor;

a second insulating cap bearing against said second end of said capacitor winding packet and including a central hollow tube extending into said hollow core tube;

a first latch part connected to the other side of said electrical current conductor and extending in said central hollow tube toward said arced floor; and a second latch part connected to said inner surface only of said arced floor and extending into said central hollow tube to latch to said first latch part.

34. A wound electrical capacitor comprising:
a can-shaped hollow housing including an open end;
a capacitor winding packet in said housing including a hollow core tube and a capacitor winding on said hollow core tube and defining a first end, and a second end adjacent said open end of said housing;

an arced floor connected to and closing said open end of said housing including an inner surface and responsive to an overpressure in said housing to deform outwardly;

an electrical current conductor extending at least partially through said hollow core tube and including a rated break point forming a breakaway fuse;

a first insulating cap bearing against said first end of said capacitor winding packet;

fastening means bearing against said first insulating cap and connected to said electrical current conductor on one side of said break point to inhibit movement of said electrical current conductor towards said arced floor;

a second insulating cap bearing against said second end of said capacitor winding packet and including a central hollow tube extending into said hollow core tube;

a first latch part connected to the other side of said electrical current conductor and extending in said central hollow tube toward said arced floor; and a second latch part connected to said inner surface only of said arced floor and extending into said central hollow tube to latch to said first latch part.

35. The wound electrical capacitor of claim 34, wherein:
said first insulating cap includes a central opening therethrough; and
said fastening means includes an insulating disc including an aperture receiving said electrical current conductor therethrough, a washer bearing against said disc on a side of said disc opposite said first insulating cap, and a bead on said electrical current conductor bearing against said washer and inhibiting movement of said electrical current conductor towards said arced floor.

36. The wound electrical capacitor of claim 34, wherein:
said first insulating cap includes a central opening; and
said fastening means comprises an elongate insulating strap connected to said electrical current conductor on one side of said break point, said insulating strap including an opening therethrough, and at least one wedge extending through said opening in said strap and bearing against said strap and said first insulating cap.

* * * * *